United States Patent [19]

Golding et al.

[11] 4,148,219

[45] Apr. 10, 1979

[54] STRAIN GAGE LOAD CELL

[75] Inventors: Frank E. Golding, Hacienda Heights; Emory W. Farr, Covina, both of Calif.

[73] Assignee: Transducers, Inc., Whittier, Calif.

[21] Appl. No.: 820,449

[22] Filed: Aug. 1, 1977

[51] Int. Cl.² .................................................. G01L 1/22
[52] U.S. Cl. ...................................... 73/141 A; 338/5
[58] Field of Search ............... 73/141 A, 88.5 R, 765; 338/5, 2; 177/211

[56] References Cited

U.S. PATENT DOCUMENTS

| 2,984,102 | 5/1961 | Soderholm | 73/141 A |
| 3,130,383 | 4/1964 | Hottinger | 73/141 A X |
| 3,303,450 | 2/1967 | Brackett, Jr. et al. | 73/141 A X |
| 3,315,203 | 4/1967 | Jacobson | 73/141 A X |
| 3,358,257 | 12/1967 | Painter et al. | 338/5 |
| 3,376,537 | 4/1968 | Pugnaire | 73/141 A X |
| 3,520,182 | 7/1970 | Kelk et al. | 73/141 A |
| 3,680,372 | 8/1972 | Ormond | 73/141 A |
| 3,759,093 | 9/1973 | Farr | 73/141 A |

*Primary Examiner*—Charles A. Ruehl
*Attorney, Agent, or Firm*—Saul Epstein

[57] ABSTRACT

A column type bonded strain gage load cell having improved linearity and output is achieved using a column having a pair of opposed transverse bores which create a web therebetween. The web has a relatively high strain as compared to the circumferential strain of an unbored column. Strain gages bonded to the web, in combination with strain gages bonded at selected regions on the column provide improved linearity and increased output.

34 Claims, 4 Drawing Figures

STRAIN GAGE LOAD CELL

BACKGROUND OF THE INVENTION

1. Field of the Invention

This invention relates to the field of strain gage load cells.

2. Description of the Prior Art

A typical prior art high capacity bonded strain gage load cell utilizes a simple column as the load bearing member. Compressive loads on such a column result in axial compressive strains, and accompanying circumferential tensile strains. The circumferential tensile strain is of smaller magnitude than the axial strain, being related to the axial strain by Poisson's ratio as is well known in the art. Poisson's ratio for steel is about 0.3. Typically, one pair of strain gages are bonded to the column with their axes parallel to the column axis and another pair bonded with their sensitive axes transverse. The four gages are connected into a bridge arrangement, which then has an output substantially proportional to applied load.

While the above described load cell provides a robust and reliable means of measuring loads, there are two basic shortcomings, which have hampered workers in the field for many years.

As noted above, in the typical prior art load cell, the transverse gages experience only about 0.3 of the strain of the longitudinal gages, resulting in an output of only about 65% of the potential output of the sensing bride. Since the maximum output of high accuracy load cells is only about 2-3 millivolts/volt of excitation, any loss in output is undesirable, and much effort has been expended in past years to device structures to overcome this limitation. The structures so devised have, in general, been complicated and expensive to produce.

Another difficulty with prior art devices is even more troublesome for high accuracy cells. For reasons that appear to be connected with the increase in diameter of the column as the cell is loaded, and perhaps also because of changes in modulus of elasticity due to stress, the standard column type load cell displays a nonlinear output with respect to load of the order of 0.2%. Since high accuracy cells must have accuracies better than 0.2%, various electrical means have been utilized to overcome this deficiency. For example, U.S. Pat. No. 3,228,240 issued to A. N. Ormond, describes additional strain gages connected to the bridge circuit to compensate for such nonlinearity. This solution is not entirely satisfactory since it requires extra electrical components and additional installation labor result in extra cost and a reduction in reliability.

SUMMARY OF THE INVENTION

The invented load cell comprises a compressively loaded column having a pair of flat bottomed holes bored laterally from either side of the column so as to leave a relatively thin web substantially on the axis.

A pair of strain gages are bonded to the web, one on each side, with their sensitive axes transverse to the axis of the column, and another pair of gages are bonded to the exterior of the column at selected positions with their axes vertical.

As the column is loaded, the web is strained laterally in tension, and the column proper is compressed. By judicious choice of dimensions, the web strain can be made to approximately equal the strain at the gages on the exterior of the column, and the full potential output of the strain gage elements attained.

Under the compressive load postulated, the sides of the column adjacent to the transverse bores tend to bulge outward in much the manner of a proving ring. The surface of the column is thus not only in compression, but also is stressed in bending. The combination of bending and compression results in an nonlinear strain, with the nonlinearity being of opposite sign with respect to the intrinsic nonlinearity of the cell. By careful selection of the position of the gages, a nonlinearity which just compensates for the intrinsic nonlinearity can be found. As a result, a net output signal achieved which is extremely linear with load, as well as being of larger amplitude when compared to a typical prior art column type load cell can be achieved.

Accordingly, it is an object of the present invention to provide a load cell having improved linearity characteristics;

It is another object of the present invention to provide a load cell having high output;

It is a further object of the present invention to provide a load cell which is relatively insensitive to off center loading; and It is still another object of the present invention to provide a highly accurate and reliable load cell at low cost.

DETAILED DESCRIPTION OF THE INVENTION

Figure 1:
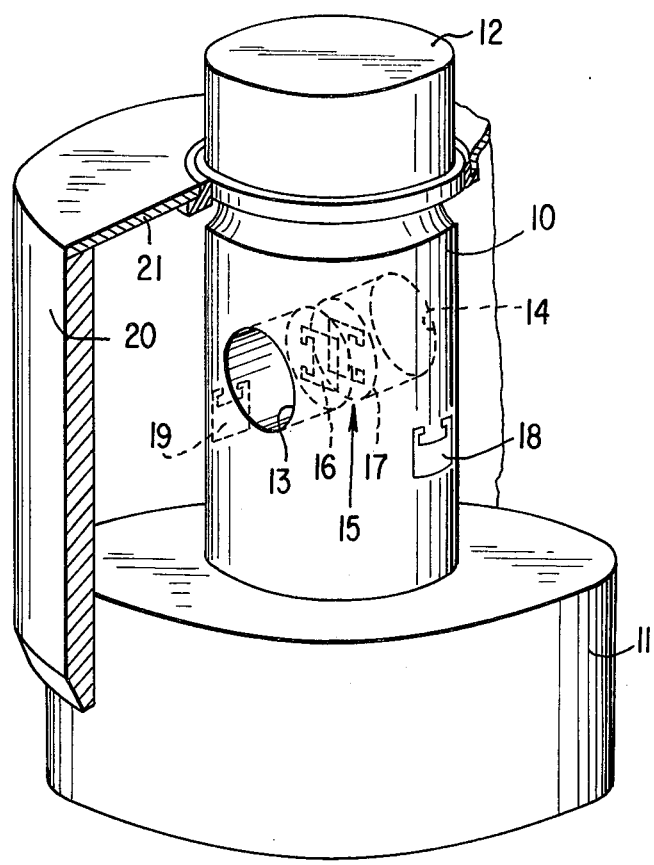
FIG. 1 is a perspective view of the invented load cell, partially broken away.
Figure 3:
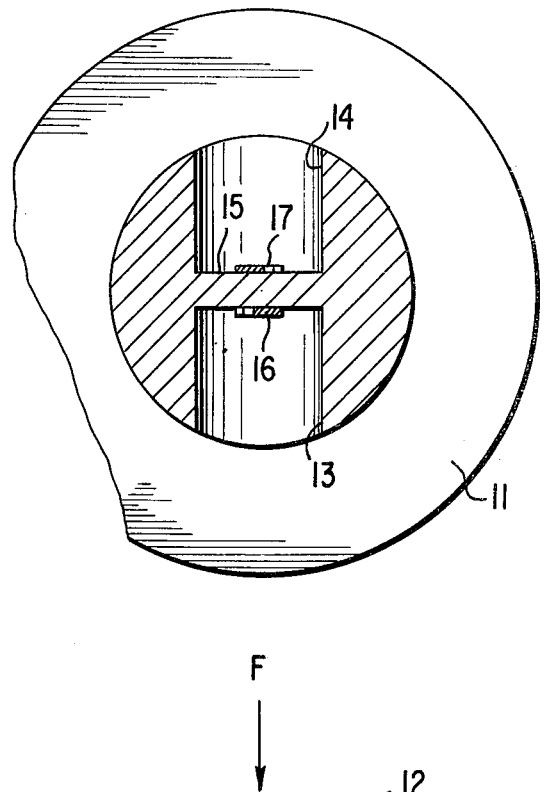
FIG. 3 is a cross sectional view of the column of the invented load cell taken at 3—3 of FIG. 2.

Referring first to FIG. 1 wherein the sensing column of the invented load cell is denoted by the numeral 10. The column 10 is supported on base 11 and is terminated at its top end by a loading button 12, which is typically slightly rounded so as to facilitate central loading of the column. A pair of flat bottomed bores 13 and 14 are bored into the sides of the column leaving a relatively thin web 15.

When load is applied to loading button 12, the column 12 experiences a generally compressive stress in the vertical direction which is maximum at the section of minimum area, the section through the center of bores 13 and 14.

Figure 2:
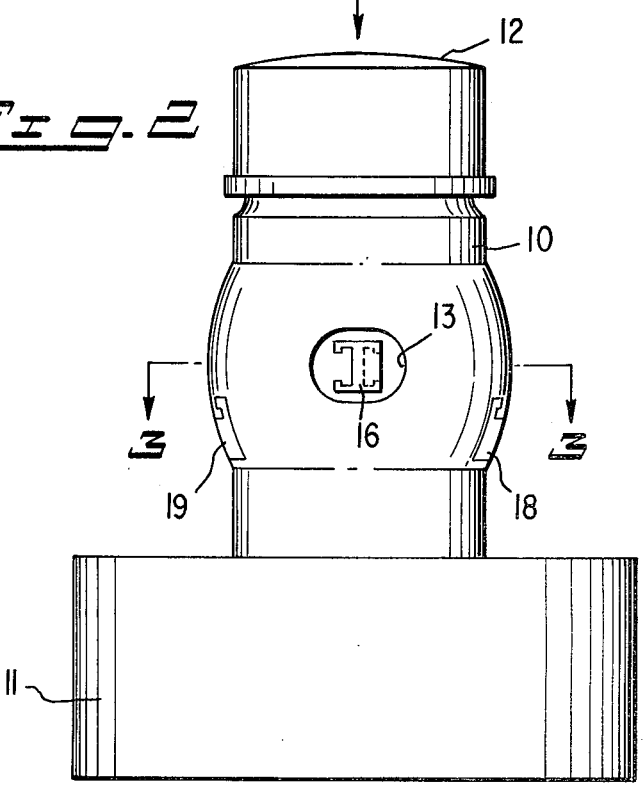
FIG. 2 is a side view of the column of the invented load cell, under load, with the deformations due to loading exaggerated.

Vertical compressive stress results in column contraction in the vertical direction accompanied by radial and circumferential elongation. This results in a "bulge" in the central are of the column and the deformation of bores 13 and 14 into ellipses, with horizontal major axes. The web 15 also distorts, experiencing tensile strains in the horizontal direction. These distortions are shown exaggerated in the side view of FIG. 2. By judicious choice of dimensions, the horizontal tensile strain in web 15 can be made any desired fraction of the compressive strain encountered at a selected point on the exterior surface of column 10. It is preferred that the web section strain be made at least 75% of the strain in the column section in order to achieve a relatively high load cell output as will be explained below.

Strain gages 16 and 17 are bonded to the sides of web 15 with their sensitive axes horizontal such that they are responsive to the tensile strains of the web.

Figure 4:
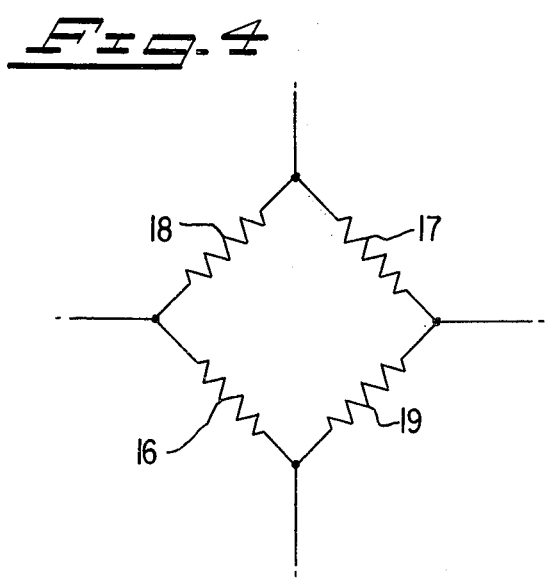
FIG. 4 is an electrical schematic of the invented load cell showing the interconnection of the strain gages.

Strain gages 18 and 19 are bonded to the outside surface of column 10 approximately in the plane of web 15, at a vertical location which is selected to achieve a desired linearity characteristic as described below. The stresses in the outer fibers of the column 10 in the vicinity of bores 13 and 14 are the result of a combination bending and compression due to the manner in which the column deforms under load. The relative contribution of the bending and compressive components varies with position, and the linearity of the strains experienced on the surface of the column with respect to load is also non-uniform. Using structures as described above, it has been found possible to locate strain gages on the exterior of the column which will undergo changes in resistance which are extremely linear with respect to applied load. Two such gages connected into a bridge configuration with gages 16 and 17 on the web, as shown in FIG. 4, can be made to produce a bridge voltage output which is virtually perfectly linear with respect to applied load.

Since the amount of nonlinearity of strain gages 18 and 19 depend upon the placement of the gages on the column 10, the nonlinearity obtained can be made to compensate for any nonlinearity of the gages 16 and 17 as well as the intrinsic nonlinearity of the structure.

The relative magnitude of the strain sensed by strain gages 16 and 17 bonded to web 15 is of great significance in determining the net output of the load cell. It will be recalled that when using a prior art load cell, the horizontal gages experience only about 0.3 of the strain experienced by the vertical gages, and that the resulting load cell output is only to 65% of the potential output. By proper choice of dimensions, the strain in web 15 can be made any desired percentage of the vertical strain with consequent increase in cell output. For example, if the strain in web 15 is made 75% of the vertical strain, a cell output of 87.5% of that which would have been obtained had the strain in web 15 been made equal to the vertical strain.

In order to protect the structure from dirt and abuse, a protective housing 20 can be used to enclose the portions of the column 10 which contain the strain gages. The bottom of housing 20 is preferably welded to base 11 and a thin diaphragm 21 attaches the top portion to loading button 12. The diaphragm 21 allows freedom of motion for the column to compress and yet protects the interior of the unit from contamination and abuse.

The efficacy of the present invention can be appreciated by reference to an example. A 50,000 pound load cell having a steel column 1.4 inches in diameter with two 0.578 inch diameter bores which left a web 15 about 0.100 inches thick was tested. Strain gages were bonded to the web 15 and at several places on the exterior surface of column 10. Using the combination of the strain gages 16 and 17 on the web with gages 18 and 19 located 0.3 inches below the center line of bores 13 and 14 connected in the form of a bridge resulted in an output having a nonlinearity of about 0.130% of full scale. When strain gages 18 and 19 located about 0.9 inches below the center of bores 13 and 14 were used, the nonlinearity dropped to about 0.03% of full scale.

The tensile strain developed in the web portion of the above described exemplar is approximately equal to the strain at the compression strain gages 18 and 19 and thus the bridge output is about 1.5 times that which would be obtained in the usual prior art unit having the same stress level. Because the bores 13 and 14 remove material near the center of the column, the column diameter is about 1.5 times the diameter of a solid column achieving the same stress level. The sensitivity to off axis loads is therefore reduced by the invented load cell.

We claim:
1. A load cell which comprises:
   (a) a load bearing column having a cylindrical portion, said cylindrical portion having a cutout portion transverse its axis;
   (b) means for coupling loads to said cylindrical portion along said axis;
   (c) an elastic member within said cutout portion, said elastic member experiencing tensile strains when said cylindrical portion is loaded in compression;
   (d) at least one strain responsive means responsive to said tensile strains of said elastic member; and
   (e) at least one strain responsive means responsive to strains on the surface of said cylindrical portion parallel to said axis.

2. The load cell as recited in claim 1 wherein said cutout portion is circular.

3. The load cell as recited in claim 1 wherein said cutout portion comprises a pair of collinear bores.

4. The load cell as recited in claim 3 wherein said elastic member is integral with said cylindrical portion and comprises at least a portion of said cylindrical portion between the ends of said bores.

5. The load cell as recited in claim 4 wherein said elastic member is disc shaped.

6. The load cell as recited in claim 4 wherein said axis passes through said elastic member.

7. The load cell as recited in claim 1 wherein said cylindrical portion is a right circular cylinder.

8. The load cell as recited in claim 1 wherein the relative sizes of said cylindrical portion and said cutout portion being such that the strains experienced by each of said strain responsive means are approximately equal.

9. The load cell as recited in claim 1 wherein the relative sizes of said cylindrical portion and said cutout portion being such that the strains experienced by said strain responsive means responsive to strains of said elastic member are more than 75% of the strains experienced by said strain responsive means responsive to strains on the surface of said cylindrical portion.

10. The load cell as recited in claim 9 wherein there are two of said strain responsive means responsive to strains of said elastic member and two of said strain responsive means responsive to strains on the surface of said cylindrical portion, and said strain responsive means are coupled to form a four arm bridge.

11. The load cell as recited in claim 10 wherein said strain responsive means responsive to strain of said cylindrical portion are positioned whereby the nonlinearity of the output of said bridge with respect to load is substantially minimized.

12. The load cell as recited in claim 1 wherein said strain responsive means responsive to strains on the surface of said cylindrical portion are positioned whereby said strain responsive means experience a change in resistance having a predetermined nonlinearity with respect to loads coupled to said cylindrical portion.

13. The load cell as recited in claim 12 and further including circuit means for providing a voltage output of said cell responsive to load wherein said predetermined nonlinearity is such as to substantially minimize the nonlinearity of said voltage output with respect to load.

14. A load cell which comprises:
(a) a load bearing column having a cylindrical portion, said cylindrical portion having a transverse hole formed therein so as to create a region on the surface of said cylindrical portion having an altered strain linearity with respect to load;
(b) means for coupling loads to said cylindrical portion along its axis;
(c) at least one strain responsive means responsive to strains on the surface of said cylindrical portion parallel to said axis in said region of altered strain linearity.

15. The load cell as recited in claim 14 wherein said strain responsive means are positioned with respect to said column whereby the strains detected by said strain responsive means are essentially linear with respect to said loads.

16. The load cell as recited in claim 14 wherein said strain responsive means are part of an electrical bridge having an input and an output, and said strain responsive means are positioned whereby the nonlinearity of the ratio of output to input of said bridge with respect to loads is minimized.

17. The load cell as recited in claim 14 wherein said hole includes a cylindrical bore transverse said axis.

18. The load cell as recited in claim 14 wherein said cylindrical portion is a right circular cylinder.

19. The load cell as recited in claim 18 wherein said strain responsive means are positioned whereby the nonlinearity of said ratio of output to input with respect to said loads is minimized.

20. The load cell as recited in claim 19 wherein said hole includes a cylindrical bore transverse said axis.

21. A load cell which comprises:
(a) a load bearing column having a cylindrical portion, said cylindrical portion having a pair of collinear bores transverse its axis;
(b) means for applying loads to said cylindrical portion along said axis;
(c) a central web defined by the ends of said bores;
(d) at least one strain responsive means responsive to strains in said web transverse said axis; and
(e) at least one strain responsive means responsive to strain at the surface of said cylindrical portion parallel to said axis.

22. The load cell as recited in claim 21 wherein said strain responsive means are coupled whereby an electrical bridge circuit including an input and an output is formed, at least one of said strain responsive means responsive to strains at the surface of said cylindrical portion being positioned whereby the nonlinearity of the ratio of output signals to input signals in response to loads is minimized.

23. The load cell as recited in claim 21 wherein the relative sizes of said load bearing column and said collinear bores are such that in response to a load, the strain detected by said strain responsive means responsive to strains in said web is at least 75% of the strain detected by said strain responsive means responsive to strains at the surface of said cylindrical portion.

24. The load cell as recited in claim 23 wherein said strain responsive means are coupled whereby an electrical bridge circuit including an input and an output is formed, at least one of said strain responsive means responsive to strains at the surface of said cylindrical portion being positioned whereby the nonlinearity of the ratio of output signals to input signals in response to loads is minimized.

25. The load cell as recited in claim 21 wherein at least one said strain responsive means responsive to strains at the surface of said cylindrical portion are positioned substantially in the plane including said web.

26. A load cell which comprises:
a. a cylindrical load bearing column of elastic material;
b. means for applying loads to said column along the axis thereof;
c. a web in a plane parallel to the axis of said column defined by the ends of a pair of cylindrical bores into said column;
d. at least one strain responsive means responsive to strains in said web transverse the axis of said column; and
e. at least one strain responsive means responsive to strains at the surface of said column parallel to the axis of said column.

27. The load cell as recited in claim 26 wherein the relative sizes of said column and said bores being such that the strains experienced by said strain responsive means responsive to strains in said web are at least 75% of the strains experienced by the strain responsive means responsive to strains at the surface of said column.

28. The load cell as recited in claim 26 wherein said strain responsive means responsive to strains in said web includes at least one strain responsive means on each side of said web and said strain responsive means responsive to strains of said column includes at least two strain responsive means at diametrically opposed locations on said column.

29. The load cell as recited in claim 28 wherein said two diametrically opposed locations are in the plane including said web.

30. The load cell as recited in claim 29 and further including circuit means for providing an electrical signal responding to varying strains experienced by said strain responsive means, said strain responsive means responsive to strains of said column being positioned whereby the nonlinearity of said electrical signal with respect to loads is substantially minimized.

31. In a load cell of the type having an elastic column subjected to loads along the axis of said column and strain responsive means responsive to strain on the surface of said column, the method of linearizing the output of said load cell with respect to load which comprises the steps of
(a) forming a transverse hole in said column so as to create a region on the surface of said column having an altered strain linearity with respect to load; and
(b) positioning at least one of said strain responsive means responsive to strains on the surface of said column in said region and parallel to said axis whereby the nonlinearity of the output of said load cell with respect to load will be substantially minimized.

32. The method as recited in claim 31 wherein said transverse hole comprises a cylindrical bore.

33. The method as recited in claim 31 wherein said transverse hole comprises a pair of flat bottomed collinear bores, the bottoms of said bores defining a web, and further including the steps of positioning at least one of said strain responsive means whereby strains of said web perpendicular to the axis of said column will be detected.

34. The method as recited in claim 33 where said strain responsive means are bonded strain gages and further including the steps of bonding said gages to the structure of said load cell and of coupling said strain gages to form a bridge.

* * * * *